US006903683B1

(12) United States Patent
Nicholson

(10) Patent No.: US 6,903,683 B1
(45) Date of Patent: Jun. 7, 2005

(54) METHOD FOR DELIVERING ASSISTANCE DATA IN AN UNSYNCHRONIZED WIRELESS NETWORK

(75) Inventor: Peter Nicholson, Bulli (AU)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 10/718,416

(22) Filed: Nov. 19, 2003

(51) Int. Cl.[7] ............................................. H04B 7/185
(52) U.S. Cl. ......................... 342/357.09; 342/357.06; 701/213
(58) Field of Search ................... 342/357.01, 357.06, 342/356, 357.09; 701/207, 213

(56) References Cited

U.S. PATENT DOCUMENTS

| | | | |
|---|---|---|---|
| 6,204,808 B1 | | 3/2001 | Bloebaum |
| 6,295,023 B1 | * | 9/2001 | Bloebaum .............. 342/357.06 |
| 6,295,449 B1 | | 9/2001 | Westerlage |
| 6,351,235 B1 | * | 2/2002 | Stilp ..................... 342/357.06 |
| 6,466,164 B1 | | 10/2002 | Akopian |
| 6,771,629 B1 | * | 8/2004 | Preston et al. .............. 370/337 |
| 2002/0069076 A1 | * | 6/2002 | Faris et al. ..................... 705/1 |
| 2003/0069694 A1 | * | 4/2003 | Fuchs et al. ................. 701/213 |

OTHER PUBLICATIONS

GSM: 3rd Generation Partnership Project, release 1999, 3GPP TS 04.35 V8.4.1, pp. 1–35.

* cited by examiner

Primary Examiner—Dao Phan
(74) Attorney, Agent, or Firm—Barnes & Thornburg

(57) ABSTRACT

A method for assisting a mobile terminal in an unsynchronized wireless communications network to determine its location using a global positioning system (GPS) by providing a GPS receiver of the mobile terminal with reference time data is disclosed. The method includes, obtaining a first time signal that is substantially synchronized with the GPS time, determining a latency time indicative of least an approximate network latency for the transmission of the reference time data through the network to the mobile terminal; generating the reference time data based on the first time signal and the latency time; and transmitting at least the reference time data to the mobile terminal.

The latency time can be determined by estimating the network latency or by obtaining demodulated time data that is substantially synchronized with the GPS time from a GPS receiver associated with a second terminal in communication with the network; receiving at the second terminal the reference time data; and comparing the demodulated time data to the reference time data to determine the latency time associated with the transmission of the reference time data to the second terminal.

26 Claims, 3 Drawing Sheets

METHOD FOR DELIVERING ASSISTANCE DATA IN AN UNSYNCHRONIZED WIRELESS NETWORK

FIELD OF THE INVENTION

The present invention relates to a method for delivering data to a mobile station for use in an assisted global positioning system (GPS). In particular the present invention relates to a method for assisting a mobile terminal in an unsynchronised wireless communications network to determine its location using a GPS by providing a GPS receiver of the mobile terminal with a reference time data.

BACKGROUND OF THE INVENTION

The ability to determine the position of mobile telephone or other mobile device connected to radio communications network is becoming a highly desirable feature. The favoured method for providing accurate position information to such devices uses a receiver associated with the device to receive GPS signals from a constellation of GPS satellites. However, because such mobile handsets are often in locations where reception of GPS satellite signals is difficult, eg. inside a car or a building, the availability and accuracy of the GPS positioning provided by the GPS receiver associated with a mobile devices is compromised.

In light of this problem the idea of assisted GPS has emerged. Assisted GPS uses a radio communications network to communicate so called "assistance data" to the mobile station. The assistance data can be used to improve, inter alia, GPS sensitivity, signal acquisition time, accuracy, and battery consumption without requiring additional hardware.

One of the key items of assistance data transmitted to a mobile station equipped with a GPS receiver is a reference time. In CDMA networks the provision of accurate time information is relatively straightforward as the cellular network is synchronised, however this is not the case with GSM or UTMS networks.

U.S. Pat. No. 6,466,164 (Akopian) teaches that in the case where a mobile station cannot receive a GPS signal from a satellite with sufficient signal strength to either demodulate the navigation information or detect bit edge information a suitable estimate of GPS clock time can be obtained from the cellular base station in communication with the mobile station. Akopian teaches that the base station must be provided with a GPS receiver which is able to demodulate the navigation information to thereby determine an accurate estimate of GPS time. This estimate of GPS time is then provided to the mobile station in a time stamped signal. Akopian teaches that a reference time signal derived in the above manner provides a sufficiently accurate estimate of GPS time to allow determination of a pseudorange measurement for the mobile station. However, the draw back of such a solution is that each base station in the cellular network must be provided with a GPS receiver. With very large cellular networks having tens-of-thousands of base stations it will be appreciated that such a solution will be prohibitively expensive to implement in large networks.

Accordingly there is a need for a more cost effective method to provide a sufficiently accurate reference signal to a mobile station in an unsynchronised communications networks.

SUMMARY OF THE INVENTION

According to a first aspect of the present invention there is provided a method for assisting a mobile terminal in an unsynchronised wireless communications network to determine its location using a global positioning system (GPS) by providing a GPS receiver of the mobile terminal with reference time data, said method including; obtaining a first time signal that is substantially synchronised with the GPS time; determining a latency time indicative of least an approximate network latency for the transmission of the reference time data through the network to the mobile terminal; generating the reference time data based on the first time signal and the latency time; and transmitting at least the reference time data to the mobile terminal.

Generating the reference time data can include adding the latency time to the first time signal. The reference time data can alternatively include data representing a time derived from the first time signal and the latency time.

The latency time can be determined by estimating the network latency. Alternatively the latency time can be determined by, obtaining demodulated time data that is substantially synchronised with the GPS time from a GPS receiver associated with a second terminal in communication with the network, receiving at the second terminal the reference time data; and comparing the demodulated time data to the reference time data to determine the latency time associated with the transmission of the reference time data to the second terminal.

The first time signal can advantageously be obtained from a network time protocol (NTP) server.

According to a second aspect of the present invention there is provided a method for assisting a mobile terminal in an unsynchronised wireless communications network to determine its location using a global positioning system (GPS) by providing a GPS receiver of the mobile terminal with reference time data, said method including:

obtaining a first time signal that is substantially synchronised with the GPS time, determining a latency time indicative of least an approximate network latency for the transmission of the reference time data through the network to the mobile terminal;

generating the reference time data based on the first time signal and the latency time; and transmitting at least the reference time data to the mobile terminal; wherein the latency time is determined by;

obtaining demodulated time data that is substantially synchronised with the GPS time from a GPS receiver associated with a second terminal in communication with the network, receiving at the second terminal the reference time data; and comparing the demodulated time data to the reference time data to determine the latency time associated with the transmission of the reference time data to the second terminal.

In a further aspect the present invention provides a method for generating a reference time for assisting a global positioning system (GPS) receiver of a mobile terminal in an unsynchronised wireless communications network to determine its location, said method including:

obtaining a first time signal that is substantially synchronised with the GPS time, determining a latency time indicative of least an approximate network latency for the transmission of reference time data through the network to the mobile terminal;

generating the reference time based at least on the first time signal and the latency time.

The reference time is preferably generated by adding the determined latency time to a time derived from the first time signal.

The latency time can be determined by: obtaining demodulated time data that is substantially synchronised with the GPS time from the GPS receiver associated with a mobile terminal in communication with the network, receiving time data derived from first time signal at the mobile terminal; and comparing the demodulated time data to the received time data to determine the latency time for the transmission of the received time data to the mobile terminal.

The reference time can be generated by the mobile station or at a component of the wireless network remote from the mobile station.

In a further aspect the present invention provides a signal for use by a mobile terminal of an unsynchronised wireless communications network to determine its location using a global positioning system (GPS), said signal including a reference time data portion generated on the basis of a first time signal that is substantially synchronised with GPS time, and a latency time indicative of least an approximate network latency for the transmission of the reference time data portion of the signal through the network to the mobile terminal.

The reference time data portion preferably includes data indicative of a reference time that leads the GPS time at the time of transmission of the reference time data portion by an amount substantially equal to said latency time.

The reference time data portion can include data indicative of the GPS time at the time of transmission of the reference time data portion, and data indicative of said latency time.

Preferably the reference time data portion includes data representing a reference time generated in as described above.

BRIEF DESCRIPTION OF THE DRAWINGS

Notwithstanding any other forms which fall within the scope of the present invention, preferred forms which will now be described by way of example only with reference to the accompanying drawings in which.

DETAILED DESCRIPTION OF THE EMBODIMENTS

Under good reception conditions a GPS receiver associated with a mobile station of a cellular telecommunications network is able to receive a GPS signal from at least four GPS satellites. The received GPS signals can then be demodulated and the position of the mobile handset determined based upon the time of travel of the GPS signals from the satellites to the mobile handset.

The data transmitted by each of the GPS satellites is made up of 30 second frames, with each frame consisting of five, six second long GPS subframes. Each GPS subframe includes a handover word including a 17-bit time of the week indicator, as well as navigation data applicable to the GPS satellite. In use, the time of week indicator can be used to ascertain the time of transmission of at least a segment of the subframe from the GPS satellite. This can then be compared to the recorded time of reception at the GPS receiver to ascertain the transmission time from the satellite to the GPS receiver, which in turn can be used to determine the distance between the GPS satellite and the receiver.

However, in environments in which only weak GPS signals can be received demodulation of the navigation message and the time of the week indicator may be difficult or even impossible. In such a situation the process of accurately matching a received pseudorandom code segment transmitted in the GPS subframe data with a corresponding pseudorandom code segment generated within the GPS receiver in order to ascertain the transmission time of the code segment becomes more difficult. This process can be simplified by providing the mobile station with a reference time (or more generally a reference original including a Reference Time position) that is approximately synchronised with the GPS time to allow determination of a suitable code range in which to begin a search of a matching code segment. It is preferable that the reference time provided to the mobile unit is accurate to within three seconds of the GPS time, and more preferably within two seconds of the GPS time.

Figure 1:
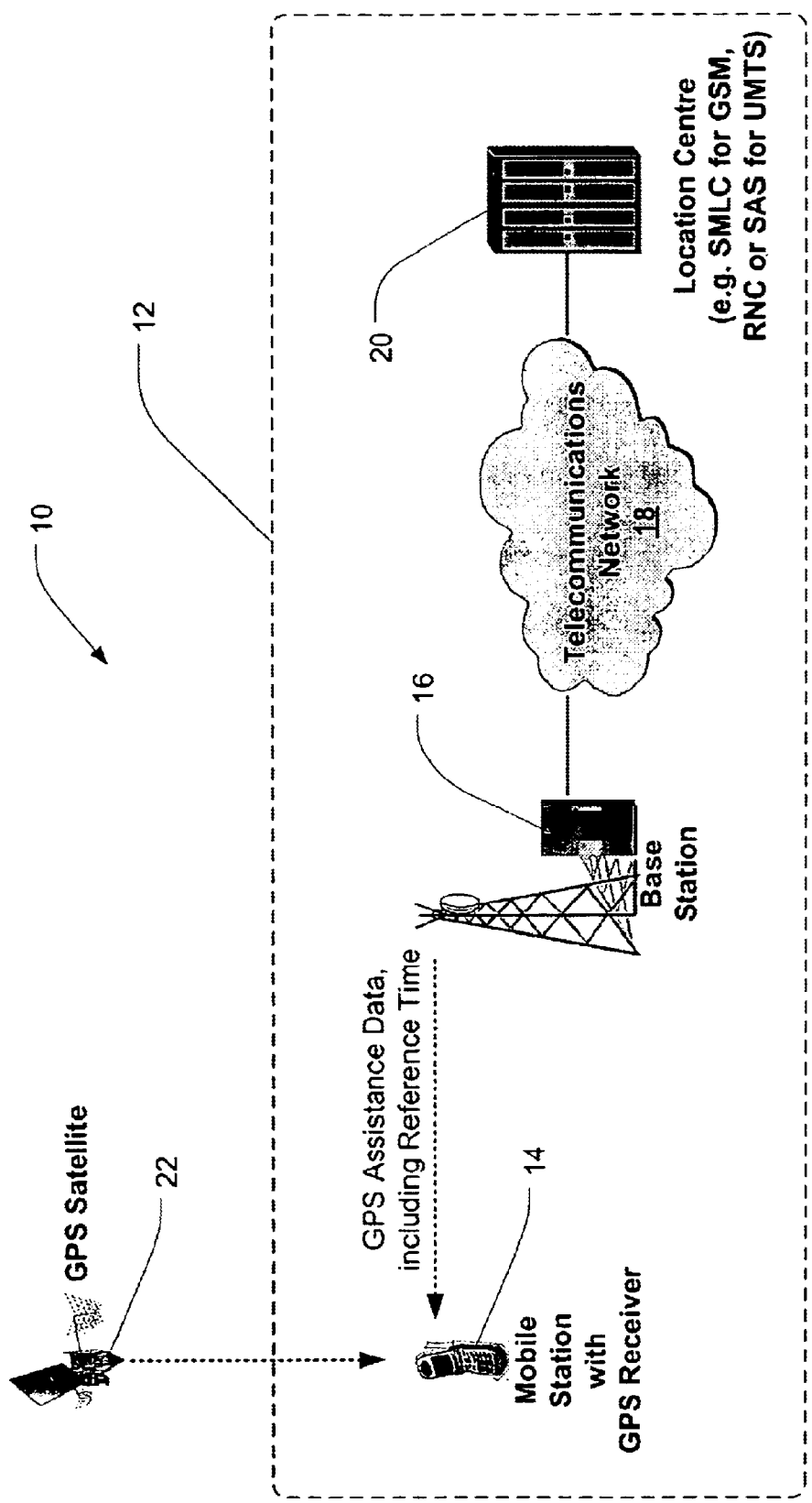
FIG. 1 shows a system configured to implement a method in accordance with an embodiment of the present invention.

FIG. 1 shows a system configured to implement the method that allows a sufficiently accurate reference time data to be transmitted to a mobile station in the network. The system 10 includes an unsynchronised cellular communications network 12 including at least one mobile station 14 in radio communication with a base transceiver station 16. The mobile station 14 is associated with a GPS receiver to allow the position of the mobile handset to be determined. The base transceiver station 16 provides an interface between the mobile station 14 and a telecommunications network 18. Also connected to telecommunications network is a location centre 20. The location centre 20 may be implemented in a number of ways, for example in a GSM network the location centre 20 may be a serving mobile location centre (SMLC). In a UMTS telecommunications network the location centre may be implemented as a radio network controller (RNC) and/or a standalone assisted GPS SMLC (SAS). The location unit obtains a clock signal that is synchronised to coordinated universal time (UTC) via a stratum one network time protocol (NTP) server. This time can be converted to GPS time by the addition of an appropriate offset.

In use the location unit 20 is configured to receive the GPS time from an NTP server (not shown) and generate reference time data for transmission to the mobile station 14. As described above, the reference time data is used by the mobile station 14 to derive an accurate time reference point to at least allow determination of which GPS subframe corresponds to a received GPS signal segment.

Figure 2:
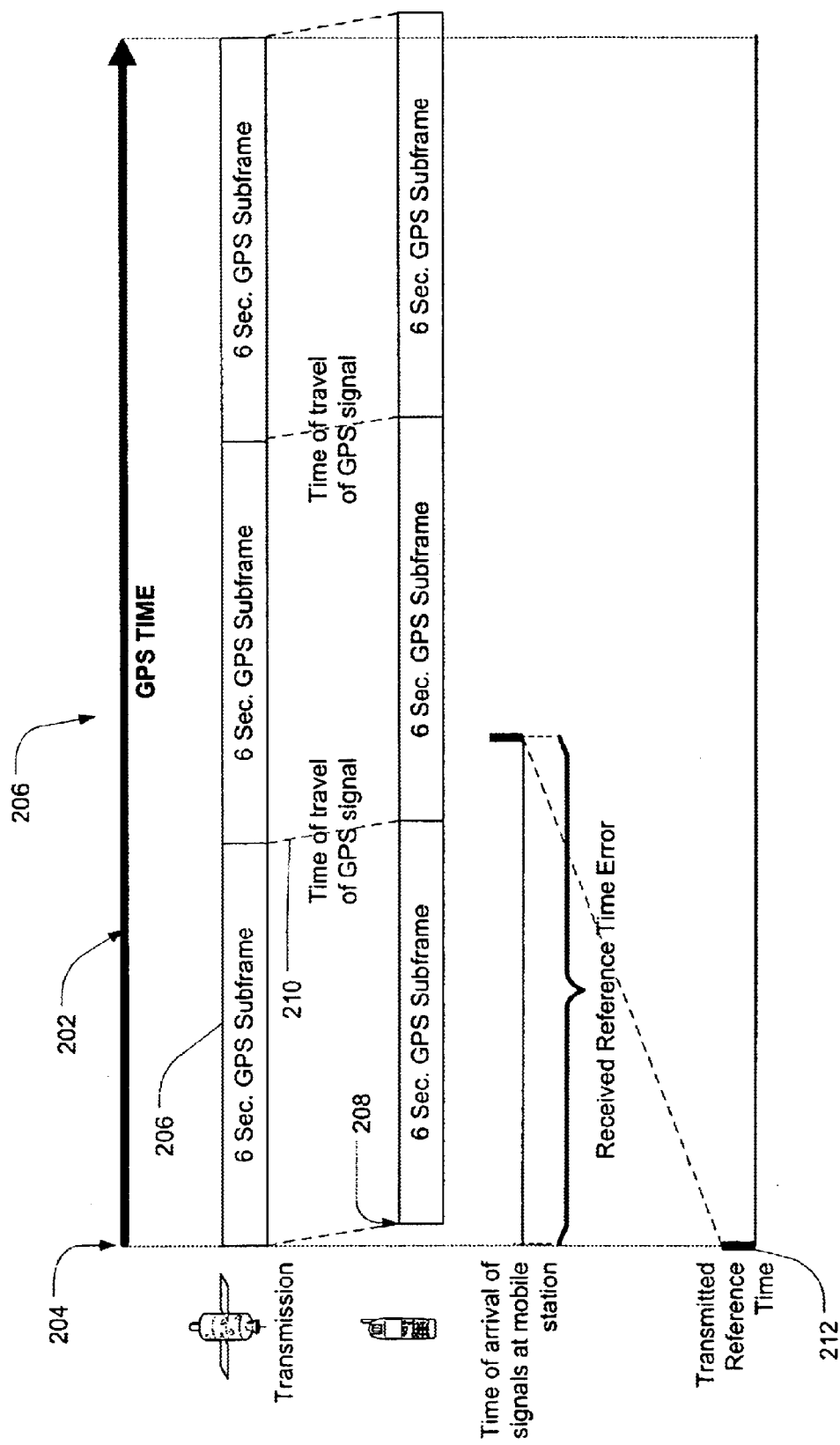
FIG. 2 shows a timing diagram illustrating the timing of the transmission and reception of a GPS subframe, and the timing of the transmission and reception of reference time data, in the network of FIG. 1.

FIG. 2 shows a timing diagram that illustrates the relative timing of various events which occur in the operation of a telecommunications network operating in accordance with the present invention. The timing diagram 200 shows the correct GPS time 202 (which is synchronised with UTC) along the top. At an initial time 204 the GPS satellite begins to transmit a six second GPS subframe for example the subframe 206. A short time thereafter 208 (usually about 80 $\mu$s) the beginning of the six second GPS subframe is received at the GPS receiver of the mobile station. The time delay between the time of transmission of the start of the GPS subframe and the arrival at the mobile station represents the time of travel of the GPS signal as indicated on the timing diagram by a dotted line 210. This time is representative of the distance between the satellite and the mobile station.

The location centre 20 of the telecommunications network 12 sends assistance data to the mobile station 14 upon receipt of a request for GPS assistance date from the mobile station. The assistance data includes reference time data representing the time of transmission of the GPS assistance data. The time of the transmission of the GPS assistance data is indicated by mark 212. In this example the transmission time of the reference time data coincides exactly with the start of transmission of the GPS subframe 206.

If transmission between the location centre 20 and the mobile station was instantaneous the reference time represented in the reference time data 212 could be used to accurately determine the time of transmission of the GPS subframe 206.

However, the network latency delays the arrival of the reference time data at its intended destination. Thus the true GPS time at the instant when the transmitted reference time data arrives at the mobile station differs from the time information contained in the reference time data.

As will be appreciated by those skilled in the art the latency contribution for a network of the type described in FIG. 1 will include propagation delays, which will typically be of the order of 117 μs, and a switching latency provided by the number of nodes through which the reference time data must travel before arriving at the mobile station. The switching latency will typically be less than one second in total. The bulk of the latency in such a communications network will be due to the data transmission rate in the network. In a GPS network transmission of GPS assistance data to the mobile station may take eight seconds depending on the quantity of assistance data transmitted. In a UMTS network the latency contribution of the data transmission rate will be in the order of one to two seconds. Thus it is expected that in most applications the network latency for delivery of the reference time data from the location unit 20 to the mobile station will be between two and eight seconds. Accordingly, it is possible that a reference time data which was transmitted during the transmission of an initial GPS subframe may arrive at the mobile station during a subsequently transmitted GPS subframe. Transmission delays of this order are undesirable and will make it almost impossible for the GPS receiver associated with the mobile station to ascertain a reasonably accurate location of the mobile station.

In order to compensate for the delivery latency of the reference time data the reference time included in the reference time data can be advanced into the future by a predetermined time representative of the network latency. Thus, the reference time encoded in the reference time data will be approximately equal to the time of arrival of the reference time data at the mobile station, and will thus provide the mobile station with an accurate reflection of the GPS time at the time of arrival of the reference time data.

That is, rather than providing reference time data including a reference time R that is equal to the GPS time T the location centre 20 provides a reference time data including a reference time R, where R=T+L, in which L is the network latency for the delivery of the reference time data to the mobile station.

In most cases the latency L can be assumed to be fixed for all mobile stations within the cellular network. In such a case the latency can be estimated or measured initially and entered into the location centre 20 for combination with the derived GPS time when generating reference time data for a mobile station. Alternative latency data can be provided to the mobile station to be added to the reference time encoded in the reference time data by the mobile station. However, this option is not preferred as it is advantageous to have the mobile station perform as little computation as possible.

In an alternative embodiment a more sophisticated method can be employed to measure the latency of the network for provision to the location centre 20. A system configured to implement this type of latency measurement method is shown in FIG. 3.

Figure 3:
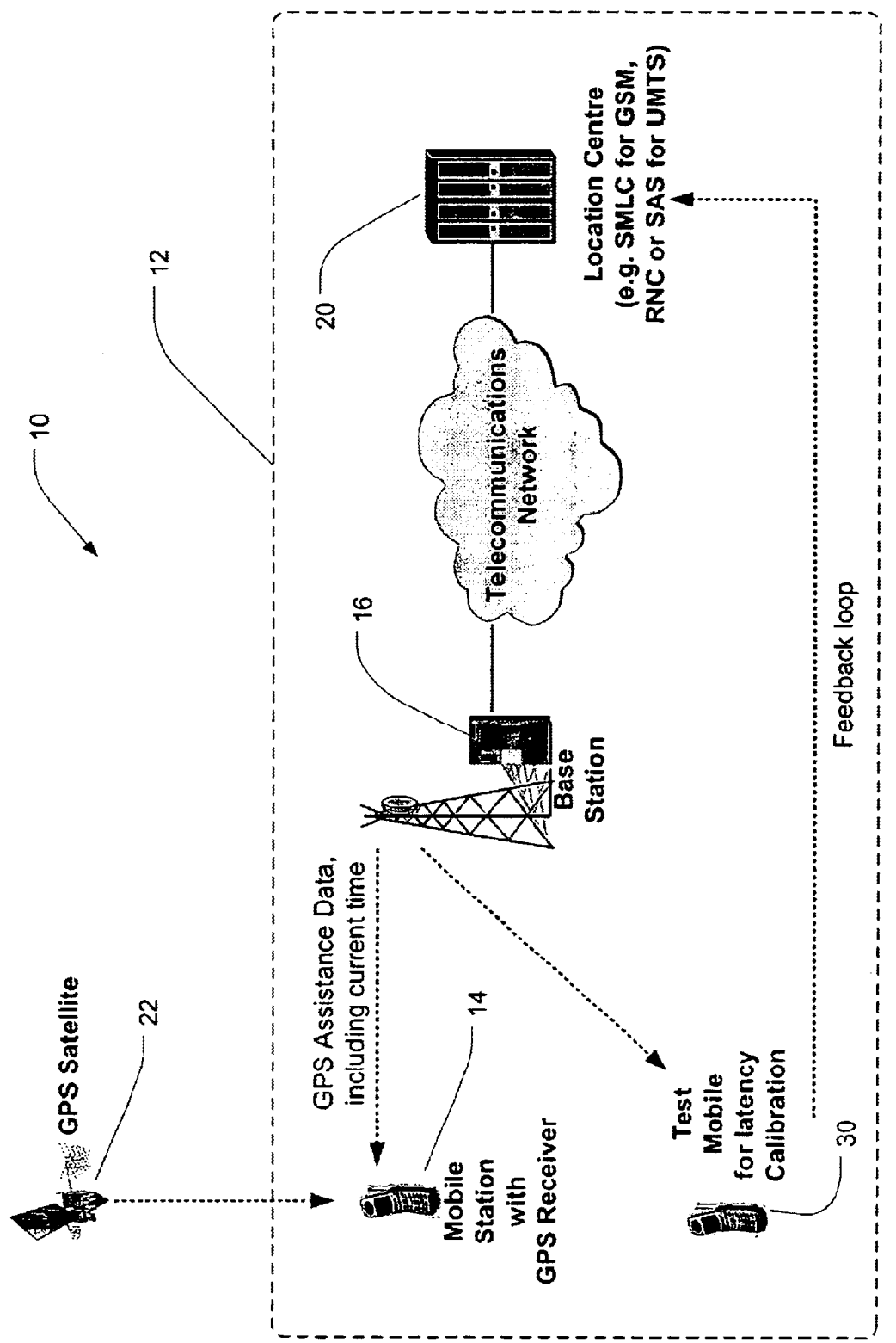
FIG. 3 shows the network of FIG. 1 configured to implement a method according to a second embodiment of the present invention.

FIG. 3 shows a telecommunications network 12 similar to that of FIG. 1. The mobile stations within the network 14 are in contact with GPS satellite 22. In addition to standard mobile stations 14 the network also includes at least one test mobile station 30. The test mobile station contains a GPS receiver and is positioned within the cellular network so that it has a clear reception of GPS signals from the GPS satellite constellation 22. The test mobile station 30 because it has clear reception from the GPS satellite constellation, is able to accurately determine the true GPS time by demodulating a receiver GPS signals.

The test mobile can be configured test the network latency. Since the test mobile 30 has its own accurate time determination from demodulating the GPS signal it can subtract the received referenced time from the received GPS time to determine the network latency L. The test mobile 30 is then configured to transmit the latency L to the location centre 20 to enable the location centre 20 to dynamically adjust the time offset L used in generating the reference time data.

In an alternative embodiment the location centre can be configured to provide a reference time data including a reference time R which is equal to the GPS time T without applying an offset. In such an embodiment at any time when a mobile station can demodulate a clear time of weak signal from the GPS satellite signal it does so and uses this to accurately to determine a network latency in much the same way as the test mobile described above. However, in this embodiment rather than transmitting the calculated network latency back to the location centre for use by all mobile terminals the mobile station 14 is configured to store the most recent network latency calculation for use as described above when the GPS signal is week and the time of weak stamp cannot be demodulated. In a further alternative embodiment a plurality of mobile stations in the network can be configured to operate as test mobile station configured to transmit back to the location centre 20 a latency calculation that was made at the most recent time that a GPS signal could be accurately demodulated. The most recent of these accurate latency calculations can be used by the location centre to provide an offset reference time to other mobile stations within the network that do not have clear communication with a GPS satellite.

It will be understood that the invention disclosed and defined herein extends to all alternative combinations of two or more of the individual features mentioned or evident from the test or drawings. All of these different combinations constitute various alternative aspects of the invention.

The foregoing describes embodiments of the present invention and modifications, obvious to those skilled in the art can be made thereto without departing from the scope of the present invention.

What is claimed is:

1. A method for assisting a mobile terminal in an unsynchronised wireless communications network to determine its location using a global positioning system (GPS) by providing a GPS receiver of the mobile terminal with reference time data, said method including:
  obtaining a first time signal that is substantially synchronised with the GPS time,
  determining a network latency time indicative of least an approximate network latency for the transmission of the reference time data through the network to the mobile terminal;
  generating the reference time data based on the first time signal and the network latency time; and
  transmitting at least the reference time data to the mobile terminal.

2. A method as claimed in claim 1 wherein the generating the reference time data includes adding the network latency time to a time derived from the first time signal.

3. A method as claimed in claim 1 wherein the reference time data includes data derived from the first time signal and network latency time.

4. A method as claimed in claim 1 in which the method includes: determining the network latency time by estimating the network latency.

5. A method as claimed in claim 1 in which determining the network latency time includes:
  obtaining demodulated time data that is substantially synchronised with the GPS time from a GPS receiver associated with a second terminal in communication with the network,
  receiving at the second terminal the reference time data; and
  comparing the demodulated time data to the reference time data to determine the network latency time associated with the transmission of the reference time data to the second terminal.

6. A method as claimed in claim 5 in which the second terminal is a mobile terminal.

7. A method as claimed in claim 1 wherein, obtaining a first time signal includes receiving an initial time signal that is substantially synchronised with Coordinated Universal Time (UTC) and applying a correction to the initial time signal to obtain a time signal that is substantially synchronised with GPS time.

8. A method as claimed in claim 7 in which the initial time signal is received from a network time protocol server.

9. A method as claimed in claim 1 in which the wireless communications network is selected from the following types of network:
  a GSM network, a UMTS network.

10. A method as claimed in claim 1 in which the time of arrival of the reference time data at the mobile terminal is within three seconds of a time value that forms part of the reference time data.

11. A method as claimed in claim 10 in which the time of arrival of the reference time data at the mobile terminal is within two seconds of a time value that forms part of the reference time data.

12. A method as claimed in claim 1 in which time of arrival of the reference time data at the mobile terminal is substantially equal to a time value forming part of the reference time data.

13. A method for assisting a mobile terminal in an unsynchronised wireless communications network to determine its location using a global positioning system (GPS) by providing a GPS receiver of the mobile terminal with reference time data, said method including:
  obtaining a first time signal that is substantially synchronised with the GPS time,
  determining a network latency time indicative of least an approximate network latency for the transmission of the reference time data through the network to the mobile terminal;
  generating the reference time data based on the first time signal and the network latency time; and transmitting at least the reference time data to the mobile terminal;
  wherein the network latency time is determined by;
  obtaining demodulated time data that is substantially synchronised with the GPS time from a GPS receiver associated with a second terminal in communication with the network,
  receiving at the second terminal the reference time data; and
  comparing the demodulated time data to the reference time data to determine the network latency time associated with the transmission of the reference time data to the second terminal.

14. A method as claimed in claim 13 wherein the generating the reference time data includes adding the network latency time to a time derived from the first time signal.

15. A method as claimed in claim 14 in which the first time signal is derived from a time signal provided by a network time protocol server.

16. A method as claimed in claim 15 in which the wireless communications network is a GSM network.

17. A method as claimed in claim 15 in which the wireless communications network is a UMTS network.

18. A method as claimed in claim 13 in which the time of arrival of the reference time data at the mobile terminal is within two seconds of a time value that forms part of the reference time data.

19. A method as claimed in claim 13 in which time of arrival of the reference time data at the mobile terminal is substantially equal to a time value forming part of the reference time data.

20. A method for generating a reference time for assisting a global positioning system (GPS) receiver of a mobile terminal in an unsynchronised wireless communications network to determine its location, said method including:
  obtaining a first time signal that is substantially synchronised with the GPS time,
  determining a network latency time indicative of least an approximate network latency for the transmission of reference time data through the network to the mobile terminal;
  generating the reference time based at least on the first time signal and the network latency time.

21. The method of claim 20 in which the reference time is generated by adding the determined network latency time to a time derived from the first time signal.

22. The method of claim 21 in which the network latency time is determined by:
  obtaining demodulated time data that is substantially synchronised with the GPS time from the GPS receiver associated with a mobile terminal in communication with the network,
  receiving time data derived from first time signal at the mobile terminal; and
  comparing the demodulated time data to the received time data to determine the network latency time for the transmission of the received time data to the mobile terminal.

23. The method of claim 22 including:
  receiving the network latency time from the mobile station at a location centre of the wireless network; and generating, at the location centre the reference time based at least on the first time signal and the received network latency time.

24. The method of claim 22 in which the determined network latency time is stored in a memory associated with the mobile station and the reference time is generated at the mobile station by combining the stored network latency time with a time derived from the first time signal.

25. A signal for use by a mobile terminal of an unsynchronised wireless communications network to determine its location using a global positioning system (GPS), said signal including a reference time data portion generated on the basis of a first time signal that is substantially synchronised with GPS time, and a network latency time indicative of least an approximate network latency for the transmission of the reference time data portion of the signal through the network to the mobile terminal wherein the reference time data portion includes data indicative of a reference time that leads the GPS time at the time of transmission of the reference time data portion by an amount substantially equal to said network latency time.

26. A signal for use by a mobile terminal of an unsynchronised wireless communications network to determine its location using a global positioning system (GPS), said signal including a reference time data portion generated on the basis of a first time signal that is substantially synchronised with GPS time, and a network latency time indicative of least an approximate network latency for the transmission of the reference time data portion of the signal through the network to the mobile terminal wherein the reference time data portion includes data indicative of the GPS time at the time of transmission of the reference time data portion, and data indicative of said network latency time.

* * * * *